(12) United States Patent
Fujii et al.

(10) Patent No.: US 8,241,516 B2
(45) Date of Patent: Aug. 14, 2012

(54) SUBSTRATE FOR MAGNETIC DISK

(75) Inventors: Shigeo Fujii, Wakayama (JP); Hiroaki Kitayama, Tokyo (JP)

(73) Assignee: Kao Corporation, Tokyo (JP)

( * ) Notice: Subject to any disclaimer, the term of this patent is extended or adjusted under 35 U.S.C. 154(b) by 925 days.

(21) Appl. No.: 12/122,532

(22) Filed: May 16, 2008

(65) Prior Publication Data
US 2008/0227370 A1 Sep. 18, 2008

Related U.S. Application Data

(62) Division of application No. 10/899,065, filed on Jul. 27, 2004, now abandoned.

(30) Foreign Application Priority Data

Aug. 8, 2003 (JP) .................................. 2003-290666

(51) Int. Cl.
*B44C 1/22* (2006.01)
*C03C 15/00* (2006.01)
*C03C 25/68* (2006.01)
*C23F 1/00* (2006.01)

(52) U.S. Cl. ........................... 216/89; 438/692; 438/693

(58) Field of Classification Search .................... 216/89; 438/692, 693
See application file for complete search history.

(56) References Cited

U.S. PATENT DOCUMENTS

| | | | |
|---|---|---|---|
| 5,676,587 A | 10/1997 | Landers et al. | |
| 6,123,603 A * | 9/2000 | Tada et al. ........................ | 451/37 |
| 6,180,202 B1 | 1/2001 | Lee | |
| 6,207,247 B1 | 3/2001 | Morita | |
| 6,335,103 B1 | 1/2002 | Suzuki et al. | |
| 6,440,187 B1 | 8/2002 | Kasai et al. | |
| 6,454,819 B1 | 9/2002 | Yano et al. | |
| 6,468,137 B1 | 10/2002 | Fang et al. | |
| 6,537,648 B1 | 3/2003 | Takahashi et al. | |
| 6,569,216 B1 * | 5/2003 | Taira et al. ....................... | 51/309 |
| 6,818,031 B2 | 11/2004 | Oshima | |
| 6,852,010 B2 | 2/2005 | Takahashi et al. | |
| 7,220,676 B2 | 5/2007 | Hagihara et al. | |
| 2001/0049913 A1 | 12/2001 | Miyata | |
| 2001/0051746 A1 | 12/2001 | Hagihara et al. | |
| 2002/0194789 A1 | 12/2002 | Oshima | |
| 2003/0073386 A1 | 4/2003 | Ma et al. | |
| 2003/0110710 A1 | 6/2003 | Oshima et al. | |
| 2003/0110803 A1 | 6/2003 | Saito et al. | |
| 2003/0113506 A1 | 6/2003 | Takahashi et al. | |
| 2003/0171072 A1 * | 9/2003 | Ward et al. ....................... | 451/28 |
| 2007/0130839 A1 | 6/2007 | Hagihara et al. | |

FOREIGN PATENT DOCUMENTS

| | | |
|---|---|---|
| JP | 11-010492 A | 1/1999 |
| JP | 11-268911 A | 10/1999 |
| JP | 2000-348330 A | 12/2000 |
| JP | 2001-89746 A | 4/2001 |
| JP | 2001-167430 A | 6/2001 |
| JP | 2002-30273 A | 1/2002 |
| JP | 2002-327170 A | 11/2002 |
| JP | 2003-155471 A | 5/2003 |
| JP | 2003-187421 A | 7/2003 |
| WO | WO-03/009349 A3 | 1/2003 |
| WO | WO-2004/033574 A | 4/2004 |

OTHER PUBLICATIONS

Trial Examiner's Inquiry dated Sep. 13, 2010 in Japanese Application No. 2003-290666.

* cited by examiner

*Primary Examiner* — Roberts Culbert
(74) *Attorney, Agent, or Firm* — Birch, Stewart, Kolasch & Birch LLP

(57) ABSTRACT

A method for manufacturing a substrate for a magnetic disk, including the steps of (a) polishing a substrate with a polishing composition A containing alumina abrasives having an average particle size of from 0.05 to 0.5 μm, and an oxidizing agent, and (b) polishing the substrate with a polishing composition B containing silica particles having an average particle size of from 0.005 to 0.1 μm; a substrate for a magnetic disk, obtainable by the method for manufacturing a substrate for a magnetic disk; and a substrate for a magnetic disk having the following surface properties of a long-wavelength waviness of 0.05 nm or more and 0.3 nm or less, and an AFM surface roughness of 0.03 nm or more and 0.2 nm or less. The substrate for a magnetic disk may be suitably used in the manufacture of a hard disk having a high recording density. Especially, a hard disk having a recording density of 50 G bits or more per square inch may be industrially manufactured.

15 Claims, No Drawings

SUBSTRATE FOR MAGNETIC DISK

This application is a Divisional of U.S. patent application Ser. No. 10/899,065, filed on Jul. 27, 2004, now abandoned the entire contents of which are hereby incorporated by reference and for which priority is claimed under 35 U.S.C. §120. U.S. application Ser. No. 10/899,065 claims priority under 35 U.S.C. §119(a) on Patent Application No(s). 2003-290666 filed in Japan on Aug. 8, 2003, the entire contents of which are hereby incorporated by reference.

FIELD OF THE INVENTION

The present invention relates to a substrate for a magnetic disk which can be used, for instance, for a hard disk having a high recording density, and a method for manufacturing the substrate.

BACKGROUND OF THE INVENTION

In order to have a smaller unit recording area and promote higher storage capacity, hard disk drives having lower flying height of the magnetic head have been desired. In order to lower the flying height of the magnetic head, the surface smoothness of the hard disk substrate has become increasingly important. So far, the surface smoothness has been evaluated by surface roughness as determined by a profilometer having a diameter of 0.2 μm and a cut off of 25 μm (wavelength: 0.2 to 25 μm), and microwaviness as determined by cut-off of 800 μm (wavelength: 0.2 to 800 μm), and reduction in the surface roughness and the microwaviness have been tried.

As a method for manufacturing a substrate in need of surface smoothness as evaluated by the surface roughness and the waviness as described above, mechanical conditions such as control of the pore size of the polishing pad, control of the hardness, and control of the polishing load or rotational speed during polishing have been studied. On the other hand, as the process for improving the polishing composition and the polishing process, in Japanese Patent Laid-Open No. Hei 11-10492, a method including the steps of carrying out a polishing process by a plurality of steps, polishing with a polishing composition containing metal oxide abrasive grains having a particle size of from 0.3 to 5 μm before final polishing, and further polishing with a polishing composition containing a colloidal particle having a particle size of from 0.01 to 0.3 μm has been studied.

SUMMARY OF THE INVENTION

The present invention relates to:
[1] a method for manufacturing a substrate for a magnetic disk, including the steps of:
(a) polishing a substrate with a polishing composition A containing alumina abrasives having an average particle size of from 0.05 to 0.5 μm, and an oxidizing agent, and
(b) polishing the substrate with a polishing composition B containing silica particles having an average particle size of from 0.005 to 0.1 μm;
[2] a substrate for a magnetic disk, obtainable by the method for manufacturing a substrate for a magnetic disk of the above [1]; and
[3] a substrate for a magnetic disk having the following surface properties:
a long-wavelength waviness of 0.05 nm or more and 0.3 nm or less, and
an AFM surface roughness of 0.03 nm or more and 0.2 nm or less.

DETAILED DESCRIPTION OF THE INVENTION

The present inventors have found that the method thus far does not have satisfactory surface performance as a substrate for a magnetic disk for a hard disk having a high recording density, especially a high recording density exceeding 50 G (giga) bits or more per square inch. The present invention relates to a substrate having a high surface smoothness required for a substrate for a magnetic disk having a high recording density, especially, for instance, having a high recording density of 50 G bits or more per square inch, and a method for manufacturing the substrate. More preferably, the present invention relates to a substrate for a magnetic disk, for instance, having a polishing rate of a practical manufacturing level, and satisfying both the surface roughness (AFM surface roughness) having a short wavelength and waviness having a long wavelength (long-wavelength waviness), and a method for manufacturing the substrate.

These and other advantages of the present invention will be apparent from the following description.

According to the present invention, a substrate having a high surface smoothness required for a substrate for a magnetic disk having a high recording density, especially, for instance, having a high recording density of 50 G bits or more per square inch can be obtained. Especially, there is exhibited an effect that a substrate for a magnetic disk, for instance, having a polishing rate of a practically manufacturing level, and satisfying both the surface roughness (AFM surface roughness) having a short wavelength and waviness having a long wavelength (long-wavelength waviness) may be obtained.

1. Substrate for Magnetic Disk

The preferred substrate for a magnetic disk of the present invention has surface properties of a long-wavelength waviness of 0.05 nm or more and 0.3 nm or less, and an AFM surface roughness of 0.03 nm or more and 0.2 nm or less.

In the present invention, it has been found that measures used in evaluating surface properties which have been so far generally used for a substrate for a magnetic disk such as a hard disk, such as surface roughness having a wavelength of 1 to 80 μm or so, as determined by "Tencor P12" (trade name, commercially available from KLA-Tencor) and "Talystep" (trade name, commercially available from Rank Taylor-Hobson Limited) or microwaviness having a wavelength of 1 to 500 μm, do not serve as satisfactory measures for surface properties of a substrate for a magnetic disk for a high recording density. It has been further found that a roughness in a short wavelength region (AFM surface roughness) and a waviness having a long waviness (long-wavelength waviness) are very useful as evaluation axes for expressing surface properties required for a substrate for a magnetic disk for a high recording density.

Specifically, the term "AFM surface roughness" as referred to herein is an average surface roughness (Ra) which can be determined with an interatomic force microscope (AFM) at a wavelength as short as 10 μm or less, and the term "long-wavelength waviness" as referred to herein is an average surface height obtained from a waviness curve having a wavelength component of 0.5 to 5 mm (Wa). The values for the AFM surface roughness and the long-wavelength waviness may be obtained according to the methods described in the Examples set forth below. The determination is made on a substrate at a portion used for magnetic recording. Typically, the determination is made on a portion excluding 10% of the portions in a radial direction from each of the inner circumference and the outer circumference of the substrate.

The combination of the "AFM surface roughness" determined by an interatomic force microscope having a wavelength shorter than the conventionally determined roughness and "long-wavelength waviness" having a wavelength of 0.5 mm or more, which is longer than the conventional as the evaluation axes for the surface properties of the substrate for a magnetic disk seems to be surprising. Although not wanting to be limited by theory, these two parameters are presumed to be useful as guidelines for the evaluation of the surface properties for a high recording density for the following reasons.

High-speed recording is to be achieved when the recording area per single bit is made smaller with the high recording density. Therefore, the stability of the signals ascribed to the follow-up property of the magnetic head for the substrate has become important. The long-wavelength waviness may be determined by an optical instrument represented by "Zygo New View" commercially available from Canon Sales, Inc.

The substrate for a magnetic disk preferably has an AFM surface roughness of 0.03 nm or more and 0.2 nm or less, more preferably 0.03 nm or more and 0.15 nm or less, and even more preferably 0.03 nm or more and 0.12 nm or less. Also, the substrate for a magnetic disk preferably has a long-wavelength waviness of 0.05 nm or more and 0.3 nm or less, more preferably 0.05 nm or more and 0.25 nm or less, and even more preferably 0.05 nm or more and 0.2 nm or less.

The substrate for a magnetic disk of the present invention refers to those which are used as substrates for media for magnetic recording, such as hard disks. Concrete examples of the substrate for a magnetic disk representatively include a substrate made of an aluminum alloy plated with Ni—P alloy; a substrate made of glass or glassy carbon, instead of the aluminum alloy, and plated with Ni—P thereon; a substrate coated with various metallic compounds by plating or deposition, instead of the substrate plated with Ni—P; and the like.

The substrate for a magnetic disk of the present invention, having preferred surface properties that the substrate has a long-wavelength waviness of 0.05 nm or more and 0.3 nm or less, and an AFM surface roughness of 0.05 nm or more and 0.2 nm or less, has a high recording density. Therefore, the substrate may be suitably used for a hard disk having a recording density of 50 G bits or more per square inch, preferably 80 G bits or more per square inch, more preferably 100 G bits or more per square inch.

2. Method for Manufacturing Substrate for Magnetic Disk

A method for manufacturing a substrate for a magnetic disk includes the steps of:
(a) polishing a substrate with a polishing composition (polishing composition A) containing alumina abrasives having an average particle size of from 0.05 to 0.5 μm, and an oxidizing agent; and
(b) polishing the substrate obtained by the process of step (a) with a polishing composition (polishing composition B) containing silica particles having an average particle size of from 0.005 to 0.1 μm.

In order to manufacture the substrate for a magnetic disk having the preferred surface properties of a long-wavelength waviness of 0.05 nm or more and 0.3 nm or less, and an AFM surface roughness of 0.03 nm or more and 0.2 nm or less, it is necessary that the long-wavelength waviness is sufficiently reduced in the polishing step (step (a)) which is carried out before step (b). Specifically, it is effective that the long-wavelength waviness is sufficiently reduced in step (a) by polishing with the polishing composition containing the alumina abrasives having an average particle size of from 0.05 to 0.5 μm and the oxidizing agent, while preferably increasing the polishing rate. It is preferable that step (b) is carried out in a final polishing step.

As the alumina abrasives usable in the present invention, the alumina abrasives having a purity as alumina of 95% or more, more preferably 97% or more, and even more preferably 99% or more are preferable, from the viewpoints of reducing the long-wavelength waviness, reducing the AFM surface roughness and increasing the polishing rate. The alumina abrasives include α-alumina, intermediate alumina and composites thereof. The intermediate alumina refers to alumina other than the α-alumina, and concrete examples thereof include γ-alumina, δ-alumina, θ-alumina, η-alumina, κ-alumina, and composites thereof.

The average particle size of alumina abrasives is preferably 0.5 μm or less, more preferably 0.4 μm or less, even more preferably 0.3 μm or less, and even more preferably 0.25 μm or less, from the viewpoint of reducing the long-wavelength waviness. The average particle size is preferably 0.05 μm or more, more preferably 0.08 μm or more, even more preferably 0.1 μm or more, and even more preferably 0.12 μm or more, from the viewpoint of increasing the polishing rate. Accordingly, in order to achieve both the reduction of long-wavelength waviness and increase in the polishing rate in a good balance, the average particle size of alumina abrasives is preferably from 0.05 to 0.5 μm, more preferably from 0.08 to 0.4 μm, even more preferably from 0.1 to 0.3 μm, and even more preferably from 0.12 to 0.25 μm. The average particle size may be determined as a volume-average particle size by using a laser diffraction method.

The specific surface area of the alumina abrasives as determined by the BET method is as follows. The α-alumina has a specific surface area of preferably from 0.1 to 50 $m^2/g$, more preferably from 1 to 40 $m^2/g$, and even more preferably from 2 to 20 $m^2/g$, and the intermediate alumina has a specific surface area of preferably from 30 to 300 $m^2/g$, and more preferably from 50 to 200 $m^2/g$, from the viewpoint of reducing the long-wavelength waviness.

As alumina abrasives, a mixture of the α-alumina and the intermediate alumina is effective, from the viewpoints of increasing the polishing rate and reducing the long-wavelength waviness. In this case, the weight ratio of the α-alumina to the intermediate alumina, α-alumina/intermediate alumina, is preferably from 99/1 to 30/70, more preferably from 97/3 to 40/60, even more preferably from 95/5 to 50/50, and even more preferably from 93/7 to 55/45.

The content of the alumina abrasives is preferably 0.05% by weight or more, more preferably 0.1% by weight or more, even more preferably 0.5% by weight or more, and even more preferably 1% by weight or more, of the polishing composition A, from the viewpoints of increasing the polishing rate and reducing the long-wavelength waviness. The content is preferably 40% by weight or less, more preferably 30% by weight or less, even more preferably 20% by weight or less, and even more preferably 10% by weight or less, from the viewpoints of the surface qualities such as surface scratches, and economic advantages. Specifically, from both viewpoints, the content of the alumina abrasives is preferably from 0.05 to 40% by weight, more preferably from 0.1 to 30% by weight, even more preferably from 0.5 to 20% by weight, and even more preferably from 1 to 10% by weight, of the polishing composition A.

The polishing composition A contains an oxidizing agent. It is effective for obtaining the long-wavelength waviness and the polishing rate on an actual manufacturing level which are necessary for a magnetic disk substrate usable for a hard disk having a high recording density, especially having a recording density of 50 G bits or more per square inch. Although not wanting to be limited by theory, while the details of the functional mechanism for polishing may not be certain, it is presumed that since an oxidizing agent is added, the oxidizing agent changes the substrate surface to a state that the polishing effect of the alumina abrasives may be satisfactorily exhibited.

The oxidizing agent usable in the present invention includes a peroxide, a nitric acid compound, an oxidizable metallic compound, and the like. The peroxide includes hydrogen peroxide; peroxides of alkali metals or the alkaline earth metals, such as sodium peroxide, potassium peroxide, calcium peroxide, barium peroxide and magnesium peroxide; peroxocarbonates, such as sodium peroxocarbonate and potassium peroxocarbonate; peroxosulfuric acids and salts thereof, such as ammonium peroxodisulfate, sodium peroxodisulfate, potassium peroxodisulfate and peroxomonosulfuric acid; peroxonitric acids and salts thereof, such as peroxonitric acid, sodium peroxonitrate and potassium peroxonitrate; peroxophosphoric acids and salts thereof, such as sodium peroxophosphate, potassium peroxophosphate and ammonium peroxophosphate; peroxoborate, such as sodium peroxoborate and potassium peroxoborate; halogeno-acids and salts thereof, such as potassium perchlorate, chloric acid, sodium hypochlorite, sodium periodate, potassium periodate, iodic acid and sodium iodate; and percarboxylic acids and salts thereof, such as peracetic acid, performic acid and perbenzoic acid. The nitric acid compound includes nitric acid and nitrates such as sodium nitrate and potassium nitrate. The oxidizable metallic compound includes iron (III) chloride; iron (III) sulfate; iron (III) citrate; iron (III) salt of EDTA, peroxochromates, such as potassium peroxochromate and sodium peroxochromate; permanganates, such as potassium permanganate and sodium permanganate. The peroxide is preferable, from the viewpoints of increasing the polishing rate and reducing the long-wavelength waviness and from the viewpoints of easy handling such as availability and water-solubility, and environmental friendliness. Among them, hydrogen peroxide, peroxosulfates or salts thereof, halogeno-acids or salts thereof are more preferable, and hydrogen peroxide is even more preferable. In addition, these oxidizing agents may be used alone or in admixture of two or more kinds.

The content of the oxidizing agent is preferably 0.002% by weight or more, more preferably 0.005% by weight or more, even more preferably 0.007% by weight or more, and even more preferably 0.01% by weight or more, of the polishing composition A, from the viewpoints of increasing the polishing rate and reducing the long-wavelength waviness. Also, the content is preferably 20% by weight or less, more preferably 15% by weight or less, even more preferably 10% by weight or less, and even more preferably 5% by weight or less, from the viewpoints of the surface quality and the economic advantages. Specifically, the content of the oxidizing agent is preferably from 0.002 to 20% by weight, more preferably from 0.005 to 15% by weight, even more preferably from 0.007 to 10% by weight, and even more preferably from 0.01 to 5% by weight, of the polishing composition A.

Water usable in the polishing composition A is used as a medium. The content is preferably from 50 to 99% by weight, more preferably from 60 to 97% by weight, and even more preferably from 70 to 95% by weight, from the viewpoint of effectively polishing the object to be polished.

It is preferable that the polishing composition A further contains an acid, from the viewpoints of increasing the polishing rate and reducing the waviness. As the acid, a pK1 of the acid is preferably 7 or less, more preferably 5 or less, even more preferably 3 or less, and even more preferably 2 or less. Here, the pK1 refers to a logarithmic value of an inverse of a first acid dissociation constant at 25° C. The pK1 of each compound is listed, for instance, in Kagaku Binran (Kisohen) II, Fourth Revision, pp. 316-325 (Edit. by Nippon Kagakukai), and the like. As the acid, an inorganic acid and an organic acid may be used. The inorganic acid includes mineral acids, such as nitric acid, sulfuric acid, sulfurous acid, hydrochloric acid, perchloric acid, phosphoric acid, pyrophosphoric acid, polyphosphoric acid, phosphonic acid, phosphinic acid and amide sulfuric acid. The organic acid includes monocarboxylic acids, such as formic acid, acetic acid, glycolic acid, lactic acid, propanoic acid, hydroxypropanoic acid, butyric acid, benzoic acid, and glycine; polycarboxylic acids, such as oxalic acid, succinic acid, glutaric acid, adipic acid, maleic acid, fumaric acid, itaconic acid, malic acid, tartaric acid, citric acid, isocitric acid, phthalic acid, nitrilotriacetic acid and ethylenediaminetetraacetic acid; alkylsulfonic and arylsulfonic acids, such as methanesulfonic acid and paratoluenesulfonic acid; alkylphosphoric acids, such as ethylphosphoric acid and butylphosphoric acid; organic phosphonic acids, such as phosphonohydroxyacetic acid, hydroxyethylidene-1,1-diphosphonic acid, phosphonobutane tricarboxylic acid and ethylenediaminetetramethylene phosphonic acid. Among them, the polyvalent acids are preferable, more preferably polyvalent mineral acids, polycarboxylic acids and organic polyphosphonic acids, and even more preferably polyvalent mineral acids and polycarboxylic acids, from the viewpoints of increasing the polishing rate and reducing the long-wavelength waviness. The polyvalent acid as referred to herein is an acid having two or more hydrogen atoms in its molecule, capable of generating hydrogen ions.

The acids may be used alone, and it is preferable to use the acids in admixture of two or more kinds. Especially in the case of polishing a magnetic disk substrate, a metal ion of an object to be polished is eluted during polishing, so that the pH of the polishing composition is increased, and that a high polishing rate cannot be obtained. In such a case, it is preferable to use a combination of an acid having a low pKa and an acid having a high pKa, in order to make the pH change smaller. When the polishing composition contains two or more kinds of the acids as mentioned above, as the acid having a low pKa, it is preferable to use a mineral acid, such as nitric acid, sulfuric acid, phosphoric acid or polyphosphoric acid, or an organic phosphonic acid, in considerations of increase in the polishing rate, reduction in the waviness, and availability. On the other hand, as the acid having a high pKa, an organic polycarboxylic acid, such as acetic acid, succinic acid, malic acid, tartaric acid or citric acid is preferable, from the same viewpoints.

The content of the acid is preferably from 0.002 to 20% by weight, more preferably from 0.005 to 15% by weight, even more preferably from 0.007 to 10% by weight, and even more preferably from 0.01 to 5% by weight, of the polishing composition A, from the viewpoints of increasing the polishing rate and reducing the long-wavelength waviness.

In addition, there can be added one or more components such as an inorganic salt, a thickener, an anticorrosive agent or a basic substance to the polishing composition A, as occasion demands. Especially, the inorganic salt such as ammonium nitrate, ammonium sulfate, potassium sulfate, nickel sulfate, aluminum sulfate or ammonium sulfamate has an auxiliary effect for increasing the polishing rate may be added. These components may be used alone or in admixture of two or more kinds. Also, the content of the other component is preferably from 0.05 to 20% by weight, more preferably from 0.05 to 10% by weight, and even more preferably from 0.05 to 5% by weight, of the polishing composition A, from the viewpoint of economic advantages. In addition, there can be added one or more components, such as a disinfectant or an antibacterial agent, as occasion demands.

The polishing composition A may be prepared by adding or mixing the intended components by a given method.

It is preferable that the pH of the polishing composition A is appropriately determined depending upon the kinds of the object to be polished and the required properties. For instance, the pH of the polishing composition A is preferably from 0.1 to 6, more preferably from 0.5 to 5, even more preferably from 1 to 4, and even more preferably from 1 to 3, from the viewpoints of increase in the polishing rate and reduction in the long-wavelength waviness, and from the viewpoints of prevention of the corrosion of the processing machine and operator safety. The pH may be adjusted by properly adding an inorganic acid, such as nitric acid or sulfuric acid; an organic acid, such as a hydroxycarboxylic acid, a polycarboxylic acid, an aminopolycarboxylic acid, an amino acid, or a metal salt or an ammonium salt thereof; or a basic substance, such as an aqueous ammonia, sodium hydroxide, potassium hydroxide or an amine, in a desired amount.

In step (a), the substrate having reduced AFM surface roughness and long-wavelength waviness may be manufactured at a polishing rate on an actual manufacturing level by a method including the steps of setting a substrate with polishing platens to which a polishing cloth made of a porous organic polymer and the like is attached; feeding the polishing composition A to a surface to be polished; and moving the polishing platens or the substrate, while applying pressure. In order to manufacture a substrate for a magnetic disk having a high recording density, especially a substrate for a magnetic disk having a recording density of 50 G bits or more per square inch, after step (a), the substrate has an upper limit of the long-wavelength waviness of preferably 0.4 nm or less, more preferably 0.35 nm or less, even more preferably 0.3 nm or less, and even more preferably 0.25 nm or less, and the substrate has a lower limit of the long-wavelength waviness of preferably 0.05 nm or more, more preferably 0.1 nm or more. Other conditions of step (a) such as a polishing machine, a polishing temperature, a polishing rate, and a feed amount of the polishing composition A are not particularly limited.

In addition, one feature of the method for manufacturing a substrate for a magnetic disk in the present invention resides in that step (a) is carried out prior to step (b).

Any polishing step carried out before step (b), preferably the final polishing step, may be carried out in a plurality of steps. In order to obtain a substrate for a magnetic disk for a hard disk having a high recording density, especially a substrate for a magnetic disk for a hard disk having a high recording density of 50 G bits or more per square inch, it is preferable that at least one of the steps prior to step (b) includes the step of polishing a substrate with a polishing composition containing alumina abrasives having an average particle size of from 0.05 to 0.5 µm and an oxidizing agent.

In the case where the polishing is carried out in plural steps, it is preferable that the sizes of the abrasives are stepwise made smaller. In addition, these polishing steps may be carried out continuously in the same polishing machine, or alternatively, separate polishing machines in order to avoid admixing of the abrasives or the polishing compositions used in the previous step. In the case where separate polishing machines are used for each of the steps, it is preferable to clean the substrate after each step.

In order to obtain a substrate for a magnetic disk having a high recording density after step (b), it is desired that the polished amount of the substrate that has been polished before step (b) is performed is 0.8 µm or more, preferably 1 µm or more, more preferably 1.2 µm or more, from the viewpoint of reduction of the long-wavelength waviness. Also, it is desired that this polished amount is 4 µm or less, preferably 3 µm or less, more preferably 2 µm or less, from the industrial viewpoint.

In addition, the polished amount of the substrate that has been polished during step (a) is preferably 0.2 µm or more, more preferably 0.3 µm or more, and even more preferably 0.5 µm or more, from the viewpoint of reduction of the long-wavelength waviness. Also, it is desired that this polished amount is 4 µm or less, preferably 3 µm or less, more preferably 2 µm or less, from the industrial viewpoint.

These polished amounts may be determined in accordance with the methods described in the Examples set forth below.

Furthermore, in consideration of an actual mass-production of the magnetic disk substrate, the polishing time of the substrate that has been polished before the polishing step (b) is preferably 10 minutes or less, more preferably 8 minutes or less, and even more preferably 6 minutes or less. The polishing rate is preferably 0.1 µm/min or more, more preferably 0.2 µm/min or more, even more preferably 0.25 µm/min or more, and even more preferably 0.3 µm/min or more, from the same viewpoints.

In the present invention, in step (b), preferably the final polishing step, the substrate for the magnetic disk having the intended surface properties can be preferably manufactured by polishing a substrate of which long-wavelength waviness and AFM surface roughness are reduced to a given level in the previous polishing steps, with the polishing composition (polishing composition B) containing the silica particles having an average particle size of from 0.005 to 0.1 µm.

The silica particles include colloidal silica particles and fumed silica particles. Among them, colloidal silica particles are preferable. The colloidal silica particles obtained by the method including the step of forming the particles from an aqueous silicic acid are more preferable, from the industrial viewpoint. Also, as the silica particles, surface-modified silica particles may be used, from the viewpoints of reducing AFM surface roughness, increasing the polishing rate and preventing defects of the substrate.

The average particle size of the silica particles is preferably from 0.005 to 0.1 µm, more preferably from 0.008 to 0.08 µm, and even more preferably from 0.01 to 0.05 µm, from the viewpoints of reducing the AFM surface roughness and long-wavelength waviness and increasing the polishing rate. The average particle size may be determined by the method described below. The photographs of the abrasive particles observed by a transmission electron microscope "JEM-2000FX" commercially available from JEOL LTD. (magnification: 10000 to 50000) are incorporated into a personal computer as image data with a scanner connected thereto. The projected area diameter of each particle is determined, using an analysis software "WinROOF" (commercially available from MITANI CORPORATION). Considering such diameter as the diameter of the particles, the average particle size is determined based on the number basis by analyzing data using a spreadsheet software "EXCEL" (commercially available from Microsoft Corporation). The average particle size is expressed based on the number basis. Additionally, by using the above-mentioned "EXCEL," the particle size distribution data of the particles on the volume basis may be also obtained by calculating the diameters of the particles into the volume of the particles. The number to be observed is preferably at least 1000, more preferably 3000 or more, and even more preferably 5000 or more.

As the silica particles, those particles of which 50% (% volume based) or more of the particles having a particle size of 0.05 μm or less, and more preferably 0.04 μm or less are preferable, wherein the particle size is determined by the above-mentioned method, from the viewpoint of reducing the surface roughness and long-wavelength waviness. This % volume based on the particles may be determined by the method described in Examples set forth below.

The content of the silica particles is preferably from 1 to 30% by weight, more preferably from 2 to 20% by weight, and even more preferably from 3 to 10% by weight, of the polishing composition B, from the viewpoints of an increase in the polishing rate, and economic advantages.

It is preferable that the oxidizing agent and the acid (and/or the salt thereof) is added and mixed to the polishing composition B usable in step (b), more preferably both the oxidizing agent and the acid are added and mixed, from the viewpoints of reducing the long-wavelength waviness and the AFM surface roughness and increasing the polishing rate.

The oxidizing agent includes a peroxide, permanganic acid or a salt thereof, chromic acid or a salt thereof, nitric acid or a salt thereof, a peroxo acid and a salt thereof, an oxyacid or a salt thereof, a metal salt of an acid, a sulfuric acid, and the like. As the peroxide, the same peroxides as in the polishing composition A may be used, and especially hydrogen peroxide, a peroxo acid or a salt thereof, and an oxyacid or salt thereof are preferable, and even more preferably hydrogen peroxide, from the viewpoints of no deposition of a metal ion to the surface, a wide use and a low cost. These oxidizing agents may be used alone or in admixture of two or more kinds. Among these oxidizing agents, nitric acid or a salt thereof may be used as an acid or a salt thereof having a pK1 of 2 or less as described later.

The content of the oxidizing agent is preferably from 0.002 to 20% by weight, more preferably from 0.005 to 15% by weight, even more preferably from 0.007 to 10% by weight, and even more preferably from 0.01 to 5% by weight, of the polishing composition B, from the viewpoints of increasing the polishing rate, reducing the AFM surface roughness and long-wavelength waviness and reducing the surface defects such as pits or scratches, thereby improving the surface qualities, and from the viewpoint of economic advantages.

As the acid, the acid which is listed in polishing composition A may be used. Among them, the inorganic acid, the organic phosphonic acid and salts thereof are preferable, from the viewpoints of increasing the polishing rate, reducing the AFM surface roughness and long-wavelength waviness, and furthermore reducing microscratches. As the inorganic acid and the salt thereof, nitric acid, sulfuric acid, hydrochloric acid, perchloric acid and the salts thereof are preferable. As the organic phosphonic acid or the salt thereof, 1-hydroxyethylidene-1,1-diphosphonic acid, aminotri(methylenephosphonic acid), ethylenediaminetetra(methylenephosphonic acid) and diethylenetriaminepenta(methylenephosphonic acid) and salts thereof are preferable. In view of pK1 of the acid, the acid and/or a salt thereof having a pK1 of 2 or less is even more preferable. The base of these acids is not particularly limited, and the salts with the metal belonging to the 1A group or with ammonium are preferable, from the viewpoint of reducing microscratches. These acids and the salts thereof may be used alone or in admixture of two or more kinds.

The content of the acid is preferably from 0.1 to 10% by weight, more preferably from 0.2 to 5% by weight, and even more preferably from 0.3 to 3% by weight, of the polishing composition B, from the viewpoints of reduction of the AFM surface roughness, increase in the polishing rate, and economic advantages.

In the polishing composition B, the balance is preferably water. Water usable in the polishing composition B is used as a medium, and the content is preferably from 60 to 98% by weight, more preferably from 70 to 97% by weight, and even more preferably from 80 to 96% by weight, from the viewpoints of reduction of the AFM surface roughness, increase in the polishing rate, and economic advantages.

In addition, there can be added one or more components, such as an inorganic salt, a thickener, an anticorrosive agent or a basic substance, to the polishing composition B, in the same manner as in the polishing composition A, as occasion demands. Especially, an inorganic salt, such as ammonium nitrate, ammonium sulfate, potassium sulfate, nickel sulfate, aluminum sulfate, or ammonium sulfamate, has an auxiliary effect of increasing the polishing rate. One or more of these components may be used alone or in admixture of two or more kinds. Also, the content of the components is preferably from 0.05 to 20% by weight, more preferably from 0.05 to 10% by weight, and even more preferably from 0.05 to 5% by weight, of the polishing composition B, from the viewpoint of economic advantages. In addition, there can be added one or more component, such as a disinfectant or an antibacterial agent, as occasion demands.

The concentration of each component of the polishing composition A and the polishing composition B is a concentration at which polishing is preferably carried out. The concentration may be the concentration during the preparation of the composition. In many cases, the composition is usually prepared as a concentrate, which is diluted before use or upon use.

The polishing composition B may be prepared by adding or mixing the intended components by a given method. It is preferable that the pH of the polishing composition B is appropriately determined depending upon the kinds of the object to be polished and the required properties. For instance, the pH of the polishing composition B is preferably from 0.1 to 6, more preferably from 0.5 to 5, even more preferably from 1 to 4, and even more preferably from 1 to 3, from the viewpoints of increase in the polishing rate and reduction in the long-wavelength waviness, and from the viewpoints of prevention of the corrosion of the processing machine and operator safety. The pH may be adjusted by properly adding an inorganic acid, such as nitric acid or sulfuric acid; an organic acid, such as a hydroxycarboxylic acid, a polycarboxylic acid, an aminopolycarboxylic acid, an amino acid, or a metal salt or an ammonium salt thereof; or a basic substance, such as an aqueous ammonia, sodium hydroxide, potassium hydroxide or an amine, in a desired amount.

In step (b), in the same manner as the above-mentioned step (a), the substrate having reduced AFM surface roughness and long-wavelength waviness may be manufactured at a polishing rate at the level used for an actual mass-production using the polishing process, including the steps of setting a substrate between polishing platens to which a polishing pad made of a porous organic polymer is attached; feeding a polishing composition B to the surface of a substrate to be polished; and moving the polishing platens and the substrate while applying pressure.

As mentioned-above, by using the method for manufacturing a substrate for a magnetic disk including step (a) and step (b), step (a) including the step of polishing a substrate with polishing composition A containing alumina abrasives having an average particle size of from 0.05 to 0.5 μm, and an oxidizing agent, is carried out before step (b), thereby adjusting a long-wavelength waviness to preferably 0.05 nm or more and 0.4 nm or less, more preferably 0.05 nm or more and 0.35 nm or less, even more preferably 0.1 nm or more and 0.3 nm or less, and even more preferably 0.1 nm or more and 0.25 nm or less. Thereafter, step (b), preferably the final polishing step, including the step of polishing the resulting substrate with the polishing composition B containing silica particles having an average particle size of from 0.005 to 0.1 μm is carried out, whereby a substrate for a magnetic disk for a high recording density, the substrate having an AFM surface roughness of preferably 0.03 nm or more and 0.2 nm or less, more preferably 0.03 nm or more and 0.15 nm or less, and even more preferably 0.03 nm or more and 0.12 nm or less, and a long-wavelength waviness of preferably 0.05 nm or more and 0.3 nm or less, preferably 0.05 nm or more and 0.25 nm or less, more preferably 0.05 nm or more and 0.2 nm or less, may be manufactured.

Since the obtained substrate for the magnetic disk has extremely excellent surface qualities, the substrate may be suitably used as a substrate for manufacturing a hard disk having a high recording density.

EXAMPLES

The following examples further describe and demonstrate embodiments of the present invention. The examples are given solely for the purposes of illustration and are not to be construed as limitations of the present invention.

Examples 1 to 4 and Comparative Examples 1 to 5

1. Preparation of Polishing Composition A and Polishing Composition B

Alumina abrasive grains, an oxidizing agent and various agents were added as shown in Table 1, to give a polishing composition A which was to be used in step (a). In addition, the colloidal silica and various agents were added as shown in Table 2, to give a polishing composition B which was to be used in step (b). In both the polishing compositions A and B, the balance was water.

2. Polishing Process of Step (a)

A substrate (long-wavelength waviness: 1.6 nm, as determined by Zygo New View 200) made of a Ni—P plated, aluminum alloy (area of both sides: 131.94 cm$^3$, Ni—P plating density: 8.4 g/cm$^3$), having a thickness of 1.27 mm and a diameter of 3.5 inch (95 mm) was polished using a double-sided processing machine under the following setting conditions, to give an object to be polished made of Ni—P plated aluminum alloy substrate usable as a substrate for a magnetic recording medium.

The setting conditions for the double-sided processing machine are as follows.
<Setting Conditions for Double-Sided Processing Machine>
Double-sided processing machine: Model 9B, commercially available from SPEEDFAM CO., LTD.
Processing pressure: 9.8 kPa
Polishing pad: "H9900" (trade name, commercially available from FUJIBO)
Rotational speed of a platen: 50 r/min
Feeding amount for a polishing composition: 100 ml/min
Polishing time period: shown in Table 1
Number of substrates introduced: 10

3. Polishing Process of Step (b)

The substrate obtained by various polishing processes before the final polishing was polished under the following setting conditions for the double-sided processing machine, to give an object to be polished made of Ni—P plated aluminum alloy substrate usable as a substrate for a magnetic recording medium.

The setting conditions for the double-sided processing machine are as follows.
<Setting Conditions for Double-Sided Processing Machine>
Double-sided processing machine: Model 9B, commercially available from SPEEDFAM CO., LTD.
Processing pressure: 7.8 kPa
Polishing pad: "Belatrix N0058" (trade name), commercially available from Kanebo, LTD.)
Rotational speed of a platen: 35 r/min
Feeding amount for a polishing composition: 100 ml/min
Polishing time period: shown in Table 2
Number of substrates introduced: 10

4. Evaluation Methods (1) Polished Amount (Removal) and Polishing Rate (Removal Rate)

Each of the substrates before and after polishing were weighed with a balance ("BP-210S" commercially available from Sartorius), and a change in weight was obtained for each substrate. An average for the polished amount of 10 substrates was taken and defined as the weight reduction. The polished amount was obtained from the following equation. Also, the value obtained by dividing the polished amount by the polishing time was defined as a polishing rate. Here, the polished amount is expressed in terms of the polished-off thickness of the substrate.

Polished Amount (μm)=[[Weight Before Polishing (g)]−[Weight After Polishing (g)]]/[[Area of Both Sides of Substrate (cm$^2$)]×[Ni—P Plating Density (g/cm$^3$)]]×10000

Polishing Rate (μm/min)=[Polished Amount (μm)]/ [Polishing Time (min)]

(2) Long-Wavelength Waviness

The long-wavelength waviness for each of the polished substrate was determined under the following conditions.

| Device: | Zygo New View 200 commercially available from Canon Sales, Inc. |
|---|---|
| Lens: | Magnification, 2.5 times, Michelson |
| Zooming Ratio: | 0.5 |
| Camera: | 320 × 240 Normal |
| Remove: | Cylinder |
| Filter type: | FFT Fixed Band Pass |
| | Filter High Wavelength 0.5 mm |
| | Filter Low Wavelength 5 mm |
| Area: | 4.33 mm × 5.77 mm |

The determination area was selected so that the center of the determination area is along a central line drawn at an equidistance from the inner circumference and the outer circumference of the disk, and that the arc direction of the area is parallel to a tangential direction of the circular disk.

Determinations were taken on five areas on each of the front and back sides per one disk evenly in a circumferential direction, and an average of the determinations was defined as the "long-wavelength waviness" of the disk.
(3) AFM Surface Roughness
The AFM surface roughness for each of the polished substrate was determined under the following conditions.

| Device: | Interatomic Force Microscope "M5E" commercially available from Veeco |
|---|---|
| Cantilever: | UL20B |
| Mode: | Non-Contact |
| Scan Rate: | 1.0 Hz |
| Scan area: | 5 × 5 μm |
| Diameter of Profilometer: | 10 nm |

The determination area was selected in the same manner as that of long-wavelength waviness. Determinations were taken on five areas on each of the front and back sides per one disk evenly in a circumferential direction, and an average of the determinations was defined as "AFM surface roughness" of the disk.

TABLE 1

| | Polishing Step before Final Polishing Working (step (a)) | | | | | | | | | | | Surface Properties |
|---|---|---|---|---|---|---|---|---|---|---|---|---|
| | Alumina Abrasive Grains | | | | | | | | | | | After step (a) |
| | | | Intermediate | | Other Additive | | | | | | | Long- |
| | α-Alumina (Average Particle Size) | % by wt. | Alumina (Average Particle Size) | % by wt. | Compound | % by wt. | Acid and the like | % by wt. | pH | Polishing Time (min.) | Polished Amount (μm) | Polishing Rate (μm/min) | Wavelength Waviness (nm) |
| Ex. No. | | | | | | | | | | | | | |
| Ex. a | α-Alumina (0.2 μm) | 4 | θ-Alumina (0.2 μm) | 1 | Hydrogen Peroxide | 0.8 | Citric Acid Sulfuric Acid Ammonium Sulfate | 1 0.2 2 | 2.0 | 4 | 1.5 | 0.38 | 0.24 |
| Ex. b | α-Alumina (0.3 μm) | 4 | θ-Alumina (0.2 μm) | 1 | Hydrogen Peroxide | 0.8 | Citric Acid Sulfuric Acid | 1 0.2 | 1.8 | 4 | 1.8 | 0.45 | 0.25 |
| Ex. c | α-Alumina (0.3 μm) | 4 | θ-Alumina (0.2 μm) | 1 | Hydrogen Peroxide | 0.8 | Sulfuric Acid | 0.5 | 1.4 | 4 | 1.4 | 0.35 | 0.28 |
| Comp. Ex. No. | | | | | | | | | | | | | |
| Comp. Ex. a | α-Alumina (1 μm) | 10 | — | | — | | Sulfonic Acid | 0.5 | 4 | 3 | 1.4 | 0.35 | |
| | α-Alumina (0.4 μm) | 10 | — | | — | | Sulfonic Acid | 0.5 | 4 | 1 | 0.08 | 0.08 | 0.65 |

α-Alumina (average particle size: 0.2 μm): purity 99.9%, specific surface area 18 m$^2$/g
α-Alumina (average particle size: 0.3 μm): purity 99.9%, specific surface area 17 m$^2$/g
α-Alumina (average particle size: 0.4 μm): purity 99.9%, specific surface area 15 m$^2$/g
α-Alumina (average particle size: 1.0 μm): purity 99.9%, specific surface area 13 m$^2$/g
θ-Alumina (average particle size: 0.2 μm): purity 99.9%, specific surface area 120 m$^2$/g
In Comparative Example a, a substrate was polished with the polishing composition and conditions in the upper row and thereafter polished with the polishing composition and conditions in the lower row.

TABLE 2

| | Step | Final Polishing Working (step (b)) | | | | | | | | Surface Properties of Final Substrate | |
|---|---|---|---|---|---|---|---|---|---|---|---|
| | Before Final Polishing Working | Abrasive Grains (Average Particle Size) | % by wt. | Oxidizing Agent | % by wt. | Other Additive | % by wt. | pH | Polishing Time (min.) | Long-Wavelength Waviness (nm) | AFM Surface Roughness (nm) |
| Ex. No. | | | | | | | | | | | |
| Ex. 1 | Ex. a | Colloidal Silica (0.02 μm) | 7 | Hydrogen Peroxide | 0.4 | Hydroxyethylidene Diphosphonic Acid | 1.5 | 1.5 | 4 | 0.17 | 0.12 |
| Ex. 2 | Ex. b | Colloidal Silica (0.02 μm) | 7 | Hydrogen Peroxide | 0.4 | Hydroxyethylidene Diphosphonic Acid | 1.5 | 1.5 | 4 | 0.19 | 0.13 |
| Ex. 3 | Ex. c | Colloidal Silica (0.02 μm) | 7 | Hydrogen Peroxide | 0.4 | Hydroxyethylidene Diphosphonic Acid | 1.5 | 1.5 | 4 | 0.19 | 0.14 |
| Ex. 4 | Ex. c | Colloidal Silica (0.02 μm) | 7 | Hydrogen Peroxide | 0.4 | Hydroxyethylidene Diphosphonic Acid | 1.5 | 1.5 | 4 | 0.19 | 0.15 |
| Comp. Ex. No. | | | | | | | | | | | |
| Comp. Ex. 1 | None | Colloidal Silica (0.02 μm) | 7 | Hydrogen Peroxide | 0.4 | Hydroxyethylidene Diphosphonic Acid | 1.5 | 1.5 | 8 | 0.64 | 0.25 |

TABLE 2-continued

| Step | | Final Polishing Working (step (b)) | | | | | | Surface Properties of Final Substrate | |
|---|---|---|---|---|---|---|---|---|---|
| | Before Final Polishing Working | Abrasive Grains (Average Particle Size) | % by wt. | Oxidizing Agent | % by wt. | Other Additive | % by wt. | pH | Polishing Time (min.) | Long-Wavelength Waviness (nm) | AFM Surface Roughness (nm) |
| Comp. Ex. 2 | Ex. a | | | | Not polished | | | | | 0.24 | 1.4 |
| Comp. Ex. 3 | Ex. a | Colloidal Silica (0.12 μm) | 7 | Hydrogen Peroxide | 0.4 | Hydroxyethylidene Diphosphonic Acid | 1.5 | 1.5 | 4 | 0.22 | 0.34 |
| Comp. Ex. 4 | Comp. Ex. a | Colloidal Silica (0.02 μm) | 7 | Hydrogen Peroxide | 0.4 | Hydroxyethylidene Diphosphonic Acid | 1.5 | 1.5 | 4 | 0.38 | 0.21 |
| Comp. Ex. 5 | Comp. Ex. a | Colloidal Silica (0.05 μm) | 10 | — | — | Sodium Hydroxide | 2 | 10 | 3 | 0.55 | 0.35 |

Colloidal Silica (average particle size: 0.02 μm): volume-based particle size at 50%: 0.035 μm
Colloidal Silica (average particle size: 0.05 μm): volume-based particle size at 50%: 0.07 μm
Colloidal Silica (average particle size: 0.12 μm): volume-based particle size at 50%: 0.17 μm It can be seen from the results shown in Tables 1 and 2 that all of the substrates for magnetic disks obtained in Examples 1 to 4 had very excellent surface properties of a long-wavelength waviness of 0.05 nm or more and 0.3 nm or less and an AFM surface roughness of 0.03 nm or more and 0.2 nm or less.

The substrate for a magnetic disk of the present invention can be suitably used in the manufacture of a hard disk having a high recording density. Especially, a hard disk having a high recording density of 50 G bits or more per square inch may be industrially manufactured.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing a substrate for a magnetic disk, comprising the steps of:
    (a) polishing a substrate with a polishing composition A comprising:
    alumina abrasives having an average particle size of from 0.1 to 0.4 μm, wherein the alumina abrasives comprise an α-alumina and an intermediate alumina;
    an oxidizing agent, wherein the oxidizing agent is hydrogen peroxide in an amount of 0.01% to 5% by weight; and
    an acid, wherein the acid is one or more members selected from the group consisting of inorganic acids and polycarboxylic acids, wherein the acid is in an amount of 0.01% to 5% by weight;
    and wherein a pH of composition A is from 0.1 to 3; and
    (b) polishing the substrate with a polishing composition B comprising silica particles having an average particle size of from 0.005 to 0.1 μm,
    wherein the substrate obtained after step (a) has surface properties of a long-wavelength waviness of 0.05 nm or more and 0.25 nm or less.

2. The method of claim 1, wherein the long-wavelength waviness has a wavelength of 0.5 to 5 mm (Wa).

3. The method of claim 1, wherein the long-wavelength waviness is an average surface height obtained from a waviness curve.

4. The method according to claim 1, wherein the substrate obtained after step (b) has surface properties of a long-wavelength waviness of 0.05 nm or more and 0.2 nm or less, and an AFM surface roughness of 0.03 nm or more and 0.2 nm or less.

5. The method according to claim 1, wherein the substrate that is to be subjected to step (b) has surface properties of a long-wavelength waviness of 0.05 nm or more and 0.25 nm or less.

6. The method according to claim 1, wherein the substrate obtained after step (b) has surface properties of a long-wavelength waviness of 0.05 nm or more and 0.25 nm or less, and an AFM surface roughness of 0.03 nm or more and 0.2 nm or less.

7. The method according to claim 1, wherein the polished amount of the substrate that has been polished before step (b) is performed is 0.8 μm or more, and the polished amount of the substrate that has been polished during step (a) is 0.2 μm or more, wherein the polished amount is expressed in terms of the polished-off thickness of the substrate.

8. The method according to claim 1, wherein the weight ratio of the α-alumina to the intermediate alumina, α-alumina/intermediate alumina, is from 99/1 to 30/70.

9. The method according to claim 1, wherein the oxidizing agent is a peroxide.

10. The method according to claim 9, wherein the polishing composition A further comprises an acid.

11. The method according to claim 1, wherein the polishing composition A further comprises an acid.

12. The method according to claim 11, wherein the polished amount of the substrate that has been polished before step (b) is performed is 0.8 μm or more, and the polished amount of the substrate that has been polished during step (a) is 0.2 μm or more, wherein the polished amount is expressed in terms of the polished-off thickness of the substrate.

13. The method according to claim 11, wherein the substrate obtained after step (b) has surface properties of a long-wavelength waviness of 0.05 nm or more and 0.25 nm or less, and an AFM surface roughness of 0.03 nm or more and 0.2 nm or less.

14. The method according to claim 11, wherein a substrate that is to be subjected to step (b) has surface properties of a long-wavelength waviness of 0.05 nm or more and 0.25 nm or less.

15. The method according to claim 13, wherein the long-wavelength waviness is 0.05 nm or more and 0.2 nm or less.

* * * * *